(12) United States Patent
Zheng et al.

(10) Patent No.: US 12,432,585 B2
(45) Date of Patent: Sep. 30, 2025

(54) MEDIUM ACCESS CONTROL LAYER MAPPING FOR PATHLOSS REFERENCE SIGNAL

(71) Applicant: QUALCOMM Incorporated, San Diego, CA (US)

(72) Inventors: Ruiming Zheng, Beijing (CN); Yan Zhou, San Diego, CA (US); Yu Zhang, San Diego, CA (US); Linhai He, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 434 days.

(21) Appl. No.: 17/756,156

(22) PCT Filed: Oct. 20, 2020

(86) PCT No.: PCT/CN2020/122100
§ 371 (c)(1),
(2) Date: May 18, 2022

(87) PCT Pub. No.: WO2021/120820
PCT Pub. Date: Jun. 24, 2021

(65) Prior Publication Data
US 2022/0417773 A1   Dec. 29, 2022

(30) Foreign Application Priority Data
Dec. 20, 2019   (WO) .............. PCT/CN2019/126997

(51) Int. Cl.
*H04W 24/08*   (2009.01)
*H04L 5/00*   (2006.01)
*H04W 72/23*   (2023.01)

(52) U.S. Cl.
CPC ........... *H04W 24/08* (2013.01); *H04L 5/0048* (2013.01); *H04W 72/23* (2023.01)

(58) Field of Classification Search
CPC ...... H04W 24/08; H04W 72/23; H04L 5/0048
See application file for complete search history.

(56) References Cited

U.S. PATENT DOCUMENTS

| | | | | |
|---|---|---|---|---|
| 11,044,677 | B2 * | 6/2021 | Ryu | ..................... H04W 52/242 |
| 11,683,763 | B2 * | 6/2023 | Ryu | ..................... H04W 52/146 |
| | | | | 370/329 |

(Continued)

FOREIGN PATENT DOCUMENTS

| | | |
|---|---|---|
| CN | 103748938 A | 4/2014 |
| CN | 107925448 A | 4/2018 |

(Continued)

OTHER PUBLICATIONS

KR 102019169900 English translation (Year: 2024).*

(Continued)

*Primary Examiner* — Sujoy K Kundu
*Assistant Examiner* — Weibin Huang
(74) *Attorney, Agent, or Firm* — Harrity & Harrity, LLP

(57) ABSTRACT

Various aspects of the present disclosure generally relate to wireless communication. In some aspects, a user equipment may receive a medium access control layer message indicating a set of mappings between a set of pathloss reference signals and one of: a set of physical uplink shared channel identifiers, or a set of sounding reference signal identifiers; receive downlink control information activating a mapping of the set of mappings; and perform a pathloss measurement using a pathloss reference signal identified by the activated mapping. Numerous other aspects are provided.

30 Claims, 13 Drawing Sheets

(56) References Cited

U.S. PATENT DOCUMENTS

| | | | |
|---|---|---|---|
| 2019/0044681 A1* | 2/2019 | Zhang | H04L 5/001 |
| 2019/0261320 A1 | 8/2019 | Yu et al. | |
| 2019/0349867 A1* | 11/2019 | MolavianJazi | H04W 52/16 |
| 2020/0119799 A1* | 4/2020 | Jung | H04B 7/0695 |
| 2022/0116882 A1* | 4/2022 | Guo | H04W 52/242 |
| 2024/0048252 A1* | 2/2024 | Jin | H04W 24/08 |

FOREIGN PATENT DOCUMENTS

| | | |
|---|---|---|
| CN | 110474730 A | 11/2019 |
| CN | 110536439 A | 12/2019 |
| WO | 2013148404 | 10/2013 |

OTHER PUBLICATIONS

KR1020190141959 English translation (Year: 2024).*

Apple Inc: "Remaining Issues on Multi-beam Operation", 3GPP TSG RAN WG1 #99, R1-1912824, Reno, USA, Nov. 18-22, 2019, Nov. 22, 2019 (Nov. 22, 2019) Section 1, 14 Pages.

Apple: "On Applicable Timing for Pathloss RS Activated/Updated by MAC-CE ", 3GPP TSG-RAN4 Meeting#93, R4-1913503, Nov. 22, 2019 (Nov. 22, 2019), 4 pages, parts 1 and 2.

International Search Report and Written Opinion—PCT/CN2019/126997—ISA/EPO—Sep. 10, 2020.

International Search Report and Written Opinion—PCT/CN2020/122100—ISA/EPO—Jan. 8, 2021.

Huawei, et al., "Enhancements on Multi-Beam Operation", 3GPP SG RAN WG1 Meeting #98bis, R1-1910074, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, XP051808412, 18 Pages, Section 2.2.

LG Electronics: "Feature Lead Summary#2 of Enhancements on Multi-beam Operations", 3GPP TSG RAN WG1 Meeting #99, R1-1913322, 3rd Generation Partnership Project Mobile Competence Centre, 650, Route Des Lucioles, F-06921 Sophia-Antipolis Cedex, France, vol. RAN WG1, No. Reno, USA, Nov. 25, pp. 1-38, XP051830607, Nov. 18-22, 2019, p. 8.

OPPO: "Discussion on Multi-Beam Operation Enhancements", 3GPP TSG RAN WG1 #99, R1-1911844, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, XP051819865, 13 Pages, Section 2, p. 5.

Supplementary European Search Report—EP20900975—Search Authority—The Hague—Jan. 3, 2024.

* cited by examiner

| | | |
|---|---|---|
| R | Serving Cell ID | BWP ID | Oct 1
| R | R | PUSCH Pathloss Reference RS ID$_1$ | Oct 2
| R | R | SRI PUSCH PowerControl ID$_1$ | Oct 3
| R | R | PUSCH Pathloss Reference RS ID$_2$ | Oct 4
| R | R | SRI PUSCH PowerControl ID$_2$ | Oct 5
| ⋮ | | |
| R | R | PUSCH Pathloss Reference RS ID$_M$ | Oct N-1
| R | R | SRI PUSCH PowerControl ID$_M$ | Oct N

FIG. 4

| | Oct 1 | Oct 2 | Oct 3 | | Oct N |
|---|---|---|---|---|---|
| R | BWP ID | $T_0$ | $T_8$ | | $T_{(N-2) \times 8}$ |
| | | $T_1$ | $T_9$ | | $T_{(N-2) \times 8+1}$ |
| | Serving Cell ID | $T_2$ | $T_{10}$ | | $T_{(N-2) \times 8+2}$ |
| | | $T_3$ | $T_{11}$ | ⋯ | $T_{(N-2) \times 8+3}$ |
| | | $T_4$ | $T_{12}$ | ⋯ | $T_{(N-2) \times 8+4}$ |
| | | $T_5$ | $T_{13}$ | | $T_{(N-2) \times 8+5}$ |
| | | $T_6$ | $T_{14}$ | | $T_{(N-2) \times 8+6}$ |
| | | $T_7$ | $T_{15}$ | | $T_{(N-2) \times 8+7}$ |

MEDIUM ACCESS CONTROL LAYER MAPPING FOR PATHLOSS REFERENCE SIGNAL

CROSS-REFERENCE TO RELATED APPLICATIONS

This Patent Application is a 371 national stage of PCT Application PCT/CN2020/122100 filed on Oct. 20, 2020, entitled "MEDIUM ACCESS CONTROL LAYER MAPPING FOR PATHLOSS REFERENCE SIGNAL," which claims priority to PCT Patent Application No. PCT/CN2019/126997, filed on Dec. 20, 2019, entitled "MEDIUM ACCESS CONTROL LAYER MAPPING FOR PATHLOSS REFERENCE SIGNAL," which are hereby expressly incorporated by reference herein.

FIELD OF THE DISCLOSURE

Aspects of the present disclosure generally relate to wireless communication and to techniques and apparatuses for medium access control (MAC) layer mapping for a pathloss reference signal (RS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a medium access control (MAC)-layer message indicating a set of mappings between a set of pathloss reference signals (RSs) and one of: a set of physical uplink shared channel (PUSCH) identifiers, or a set of sounding reference signal (SRS) identifiers; receiving downlink control information (DCI) activating a mapping of the set of mappings; and performing a pathloss measurement using a pathloss reference RS identified by the activated mapping.

In some aspects, a method of wireless communication, performed by a base station, may include transmitting a MAC-layer message indicating a set of mappings between a set of pathloss reference RS identifiers and one of: a set of PUSCH power control identifiers, or a set of SRS resource set identifiers; transmitting DCI activating a mapping of the set of mappings; and transmitting a pathloss reference RS for a pathloss measurement in accordance with the activated mapping.

In some aspects, a UE for wireless communication may include memory and one or more processors operatively coupled to the memory. The memory and the one or more processors may be configured to receive a MAC-layer message indicating a set of mappings between a set of pathloss reference RS identifiers and one of: a set of PUSCH power control identifiers, or a set of SRS resource set identifiers; receive DCI activating a mapping of the set of mappings; and perform a pathloss measurement using a pathloss reference RS identified by the activated mapping.

In some aspects, a base station for wireless communication may include memory and one or more processors operatively coupled to the memory. The memory and the one or more processors may be configured to transmit a MAC-layer message indicating a set of mappings between a set of pathloss reference RS identifiers and one of: a set of PUSCH power control identifiers, or a set of SRS resource set identifiers; transmit DCI activating a mapping of the set of mappings; and transmit a pathloss reference RS for a pathloss measurement in accordance with the activated mapping.

In some aspects, a non-transitory computer-readable medium may store one or more instructions for wireless communication. The one or more instructions, when executed by one or more processors of a UE, may cause the one or more processors to: receive a MAC-layer message indicating a set of mappings between a set of pathloss reference RS identifiers and one of: a set of PUSCH power control identifiers, or a set of SRS resource set identifiers; receive DCI activating a mapping of the set of mappings; and perform a pathloss measurement using a pathloss reference RS identified by the activated mapping.

In some aspects, a non-transitory computer-readable medium may store one or more instructions for wireless communication. The one or more instructions, when executed by one or more processors of a base station, may cause the one or more processors to: transmit a MAC-layer message indicating a set of mappings between a set of pathloss reference RS identifiers and one of: a set of PUSCH power control identifiers, or a set of SRS resource set identifiers; transmit DCI activating a mapping of the set of mappings; and transmit a pathloss reference RS for a pathloss measurement in accordance with the activated mapping.

In some aspects, an apparatus for wireless communication may include means for receiving a MAC-layer message indicating a set of mappings between a set of pathloss reference RS identifiers and one of: a set of PUSCH power control identifiers, or a set of SRS resource set identifiers; means for receiving DCI activating a mapping of the set of mappings; and means for performing a pathloss measurement using a pathloss reference RS identified by the activated mapping.

In some aspects, an apparatus for wireless communication may include means for transmitting a MAC-layer message indicating a set of mappings between a set of pathloss reference RS identifiers and one of: a set of PUSCH power control identifiers, or a set of SRS resource set identifiers; means for transmitting DCI activating a mapping of the set of mappings; and means for transmitting a pathloss reference RS for a pathloss measurement in accordance with the activated mapping.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-7 are diagrams illustrating example signal structures for a MAC-layer message indicating a mapping of a pathloss reference RS identifier and a physical uplink shared channel identifier, in accordance with various aspects of the present disclosure.

FIGS. 8-11 are diagrams illustrating example signal structures for a MAC-layer message indicating a mapping of a pathloss reference RS identifier and a sounding reference signal identifier, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
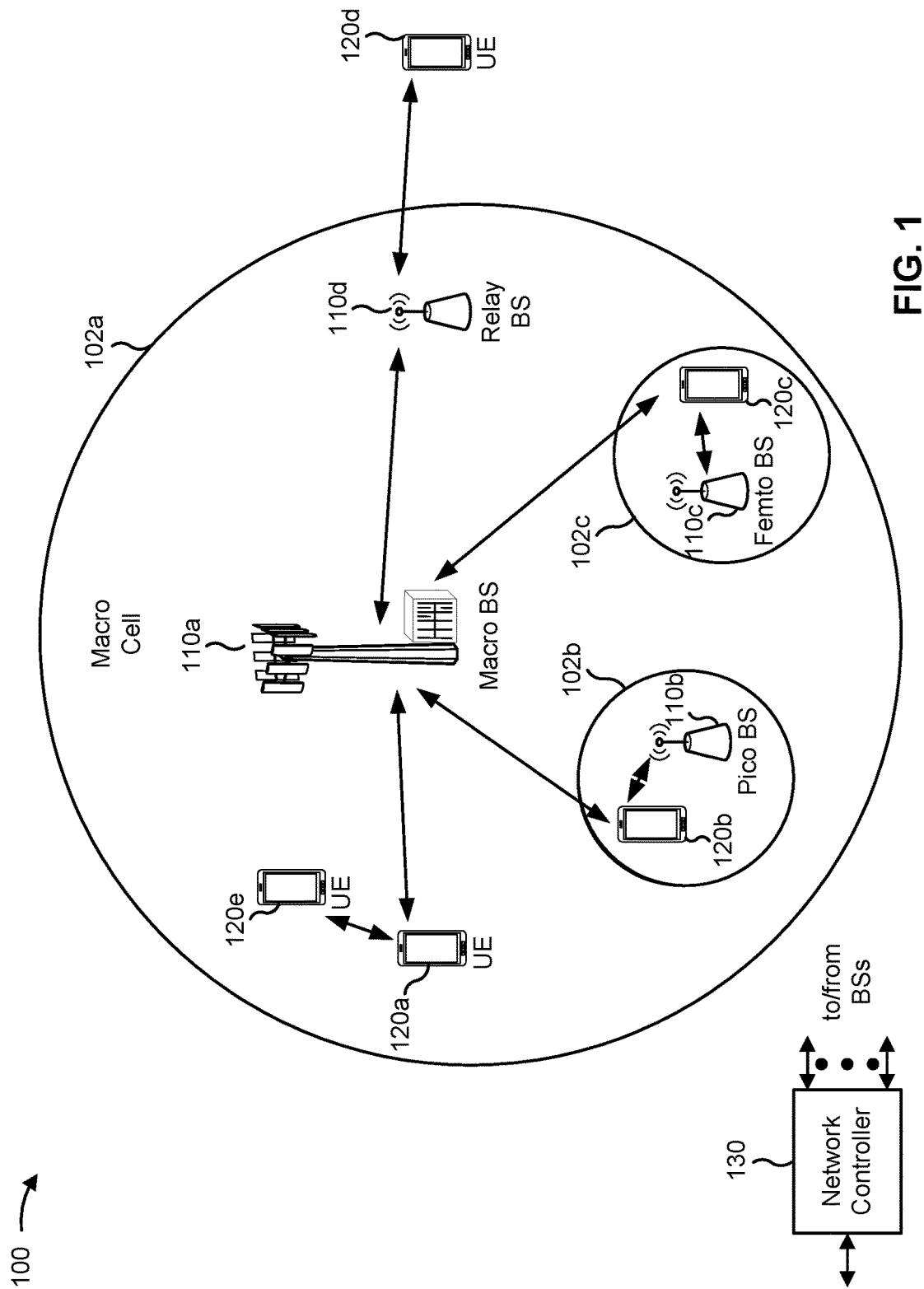
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
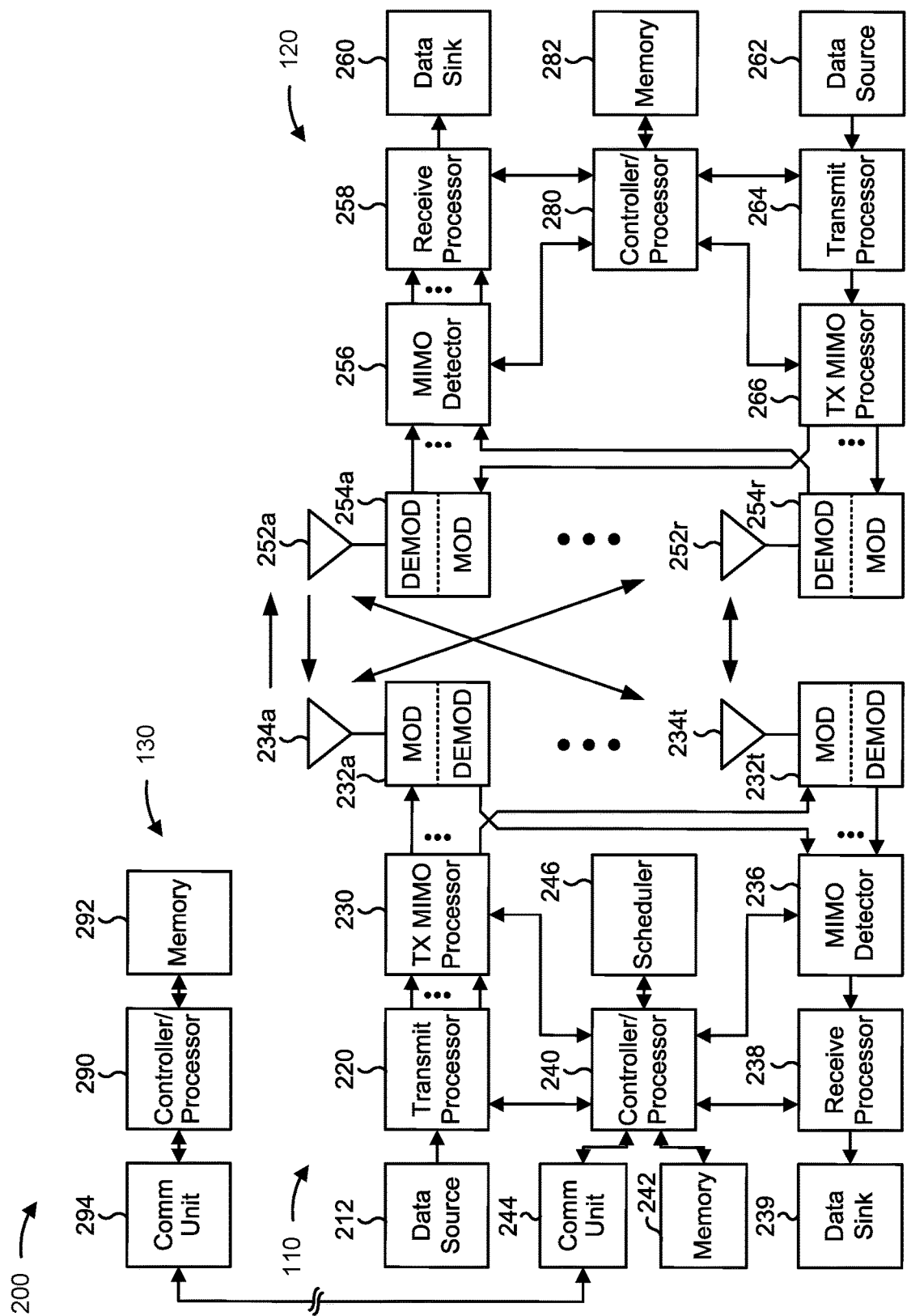
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with medium access control (MAC) layer indication of mappings for pathloss reference signals, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, process 1300 of FIG. 13, and/or other processes as described herein. A scheduler 246 may schedule UEs for data transmission on the downlink and/or uplink.

In some aspects, UE 120 may include means for receiving a MAC-layer message indicating a set of mappings between a set of pathloss reference signals (RSs) and one of a set of physical uplink shared channel (PUSCH) identifiers, or a set of sounding reference signal (SRS) identifiers; means for receiving downlink control information (DCI) activating a mapping of the set of mappings; means for performing a pathloss measurement using a pathloss RS identified by the activated mapping; means for receiving information configuring a maximum number of pathloss reference RS identifiers that can be configured in the MAC-layer message; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a MAC-layer message indicating a set of mappings between a set of pathloss reference RS identifiers and one of a set of PUSCH power control identifiers, or a set of SRS resource set identifiers; means for transmitting DCI activating a mapping of the set of mappings; means for transmitting a pathloss RS for a pathloss measurement in accordance with the activated mapping; means for transmitting information configuring a maximum number of pathloss reference RS identifiers that can be configured in the MAC-layer message; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may perform a pathloss measurement to determine a pathloss value for a channel between the UE and a base station. For example, the UE may perform the pathloss measurement for the purpose of power control and beam measurement of an uplink transmission, such as a PUSCH, an SRS (e.g., an aperiodic SRS (AP-SRS) or a semi-persistent SRS (SP-SRS)), a physical uplink control channel (PUCCH), and/or the like.

The UE may perform pathloss measurements using a pathloss RS. The pathloss RS may be mapped to a synchronization signal block (SSB) index or a channel state information reference signal (CSI-RS) resource index by reference to a pathloss reference RS identifier of the pathloss RS. For example, the UE may be configured (e.g., using radio resource control (RRC) signaling and/or the like) with one or more configurations for the pathloss reference RS identifier that map to different SSB indexes or CSI-RS resource indexes. Furthermore, the UE may be configured with one or more mappings between pathloss reference RS identifiers (that are mapped to different SSB indexes or CSI-RS indexes) and corresponding PUSCH power control identifiers or SRS resource set identifiers. The PUSCH power control identifier may be used when the UE is to perform PUSCH power control or beam measurement, and the SRS resource set identifier may be used when the UE is to perform SRS power control or beam management.

The UE may receive downlink control information (DCI) that includes an SRS resource indicator field that indicates a PUSCH power control identifier or an SRS resource set identifier, and may use a CSI-RS or SSB index that corresponds to the pathloss reference RS identifier mapped to the PUSCH power control identifier or the SRS resource set identifier that was indicated by the DCI. This may be referred to as activating the mapping or updating the mapping. Put another way, the DCI may indicate a PUSCH power control identifier or an SRS resource set identifier (depending on which type of power control the UE is to perform), and the UE may determine a pathloss reference RS index mapped to the PUSCH power control identifier or the SRS resource set identifier, then may identify the RS to be used as the pathloss RS based at least in part on which RS (of the CSI-RS and the SSB) is configured as associated with the pathloss reference RS index.

It may be beneficial to reconfigure mappings of the pathloss reference RS index and the PUSCH power control identifier or the SRS resource set identifier. For example, the UE may be configurable with a limited number of mappings, or the operating conditions of the UE might change, thereby warranting an updated mapping. However, reconfiguring a mapping using a higher-layer communication, such as RRC signaling, may involve significant latency and complexity, thereby consuming radio and computing resources of the UE and a corresponding base station.

Some techniques and apparatuses described herein provide for medium access control (MAC)-layer reconfiguration of mappings for pathloss RS measurement. For example, some techniques and apparatuses described herein provide signaling structures and procedures for the MAC-layer reconfiguration, such as various explicit and implicit signaling techniques. In this way, flexibility of configuration of mappings for pathloss RS measurement may be improved and latency may be reduced, thereby reducing computing resource usage.

Figure 3:
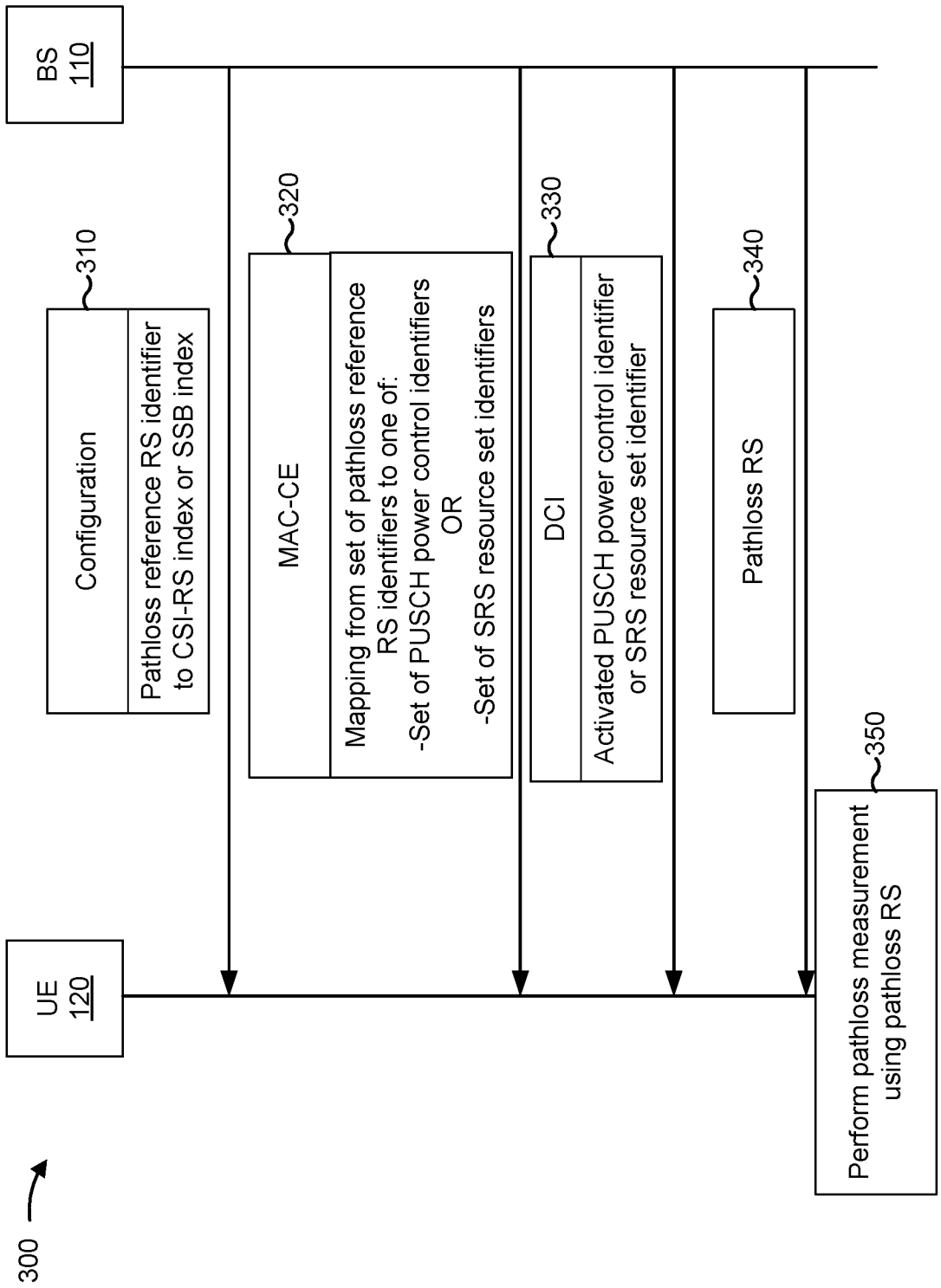
FIG. 3 is a diagram illustrating an example of signaling for MAC-layer mapping of a pathloss RS, in accordance with various aspects of the present disclosure.

FIG. 3 is a diagram illustrating an example 300 of signaling for MAC-layer mapping of a pathloss RS, in accordance with various aspects of the present disclosure. As shown, example 300 includes a UE 120 and a BS 110.

As shown in FIG. 3, and by reference number 310, the BS 110 may provide configuration information to the UE 120. For example, the configuration information may include RRC signaling and/or the like. The configuration information may identify a mapping between a pathloss reference RS identifier (or a set of pathloss reference RS identifiers) and an RS, such as an SSB identified by an SSB index, a CSI-RS identified by a CSI-RS index, and/or the like. In some aspects, when the pathloss reference RS identifier is to be used for PUSCH power control, the pathloss reference RS identifier may be a value of the parameter PUSCH-PathlossReferenceRS-ID. In some aspects, when the pathloss reference RS identifier is to be used for AP-SRS/SP-SRS power control, the pathloss reference RS identifier may be a value of the parameter pathlossReferenceRS. In some aspects, a pathloss reference RS identifier may be referred to as a pathloss RS identifier.

As shown by reference number 320, the BS 110 may provide a MAC-layer message to the UE 120. The MAC-layer message may include a MAC control element (CE) or a plurality of MAC-CEs. In some aspects, the MAC-layer message may identify a set of mappings between a set of pathloss reference RS identifiers and a set of PUSCH power control identifiers (e.g., in a one-to-one configuration, a many-to-one configuration, or a one-to-many configuration). For example, the MAC-layer message may identify a set of mappings between PUSCH-PathlossReferenceRS-ID and the parameter sri-PUSCH-PowerControlId. In some aspects, the MAC-layer message may identify a set of mappings between a set of pathloss reference RS identifiers and a set of SRS resource set identifiers. For example, the MAC-layer message may identify a set of mappings between pathloss-ReferenceRS and a set of values for srs-ResourceSetID.

Examples of a message structure for the MAC-layer message used to provide mappings between pathloss reference RS identifiers and PUSCH power control identifiers are shown in FIGS. 4-7. Examples of a message structure for the MAC-layer message used to provide mappings between pathloss reference RS identifiers and SRS resource set identifiers are shown in FIGS. 8-11.

As shown by reference number 330, the BS 110 may provide DCI that activates a PUSCH power control identifier or an SRS resource set identifier. For example, an SRS resource indicator (SRI) field of the DCI may indicate a value of sri-PUSCH-PowerControlId associated with a mapping, of the set of mappings provided to the UE 120 in connection with reference number 320. As another example, a field of the DCI may indicate an SRS resource set identifier or a value for srs-ResourceSetID. As shown by reference number 340, the BS 110 may transmit a pathloss RS to the UE 120. The pathloss RS may include an RS corresponding to the PUSCH power control identifier or SRS resource set identifier activated by the DCI, which the UE 120 may identify by reference to the mapping associated with the activated PUSCH power control identifier or SRS resource set identifier and the configuration of the pathloss reference RS identifier to which the PUSCH power control identifier or SRS resource set identifier is mapped. As shown by reference number 350, the UE 120 may perform a pathloss measurement using the pathloss RS. In some aspects, the UE 120 may perform a power control operation or a beam measurement operation using the pathloss RS, or may perform an uplink transmission (e.g., of a PUSCH, an AP-SRS, an SP-SRS, a PUCCH, and/or the like) in accordance with the power control operation (not shown). In this way, the BS 110 may signal, to the UE, mappings for pathloss measurement using MAC-layer signaling, which reduces latency and conserves computing resources relative to RRC-layer signaling.

As indicated above, FIG. 3 is provided as an example. Other examples may differ from what is described with respect to FIG. 3.

FIGS. 4-7 are diagrams illustrating examples 400, 500, 600, 700 for signal structures for a MAC-layer message indicating a mapping of a pathloss reference RS identifier and a PUSCH power control identifier, in accordance with various aspects of the present disclosure. FIGS. 8-11 are diagrams illustrating examples 800, 900, 1000, 1100 for signal structures a MAC-layer message indicating a mapping of a pathloss RS and a sounding reference signal identifier, in accordance with various aspects of the present disclosure. In FIGS. 4-11, the horizontal axis shown, for example, by reference number 410 of FIG. 4 indicates bit columns. For example, the rightmost column of squares in FIG. 4 may represent a first bit of respective Octets 1 through N (shown as October 1 through Oct N at the right side of FIG. 4) and so on.

FIG. 4 shows an example of explicit indication of the mapping between a pathloss reference RS identifier (shown as PUSCH Pathloss Reference RS ID) and a PUSCH power control identifier (shown as SRI PUSCH PowerControl ID). As shown by reference number 420, in some aspects, the MAC-layer message may indicate a serving cell identifier and a bandwidth part identifier for the mapping (as do the examples 500 through 1100). In example 400, the MAC-layer message explicitly identifies a set of pathloss reference RS identifiers (shown as PUSCH Pathloss Reference RS $ID_1$ through PUSCH Pathloss Reference RS $ID_M$) and a corresponding set of PUSCH power control identifiers (shown as SRI PUSCH PowerControl $ID_1$ through SRI PUSCH PowerControl $ID_M$). For example, there may be a one-to-one mapping between PUSCH Pathloss Reference RS IDs and SRI PUSCH PowerControl IDs (e.g., PUSCH Pathloss Reference RS $ID_1$ may be mapped to SRI PUSCH PowerControl $ID_1$, and so on). The MAC-layer message of example 400 may be particularly useful for explicitly reconfiguring a large number of mappings without the overhead associated with additional or different messages.

Figure 5:
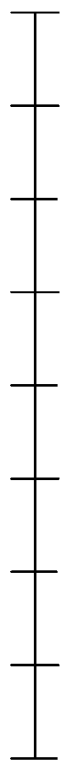

FIG. 5 shows an example of indication of the mapping between a pathloss reference RS identifier and a PUSCH power control identifier using a bitmap. For example, the $P_i$ fields shown by reference number 510 may correspond to respective pathloss reference RS identifiers. A UE (e.g., UE 120) may be configured (e.g., using RRC signaling and/or the like) with information indicating a mapping between the $P_i$ fields and the respective pathloss reference RS identifiers. If a $P_i$ field is activated (e.g., if the Pi field is set to a particular value), then the MAC-layer message may include a PUSCH power control identifier corresponding to a pathloss reference RS identifier mapped to the $P_i$ field. As an example, assume that $P_1$ and $P_2$ are activated, assume that $P_1$ is mapped to a first pathloss reference RS identifier, and assume that $P_2$ is mapped to a second pathloss reference RS identifier. In this case, the PUSCH power control identifier shown by reference number 520 may be mapped to the first pathloss reference RS identifier, and the PUSCH power control identifier shown by reference number 530 may be mapped to the second pathloss reference RS identifier. For example, the PUSCH power control identifiers may be mapped to the pathloss reference RS identifiers in the order of the activated $P_i$ field values. Example 500 may provide lower overhead than, for example, an explicit signaling scheme.

Figure 6:
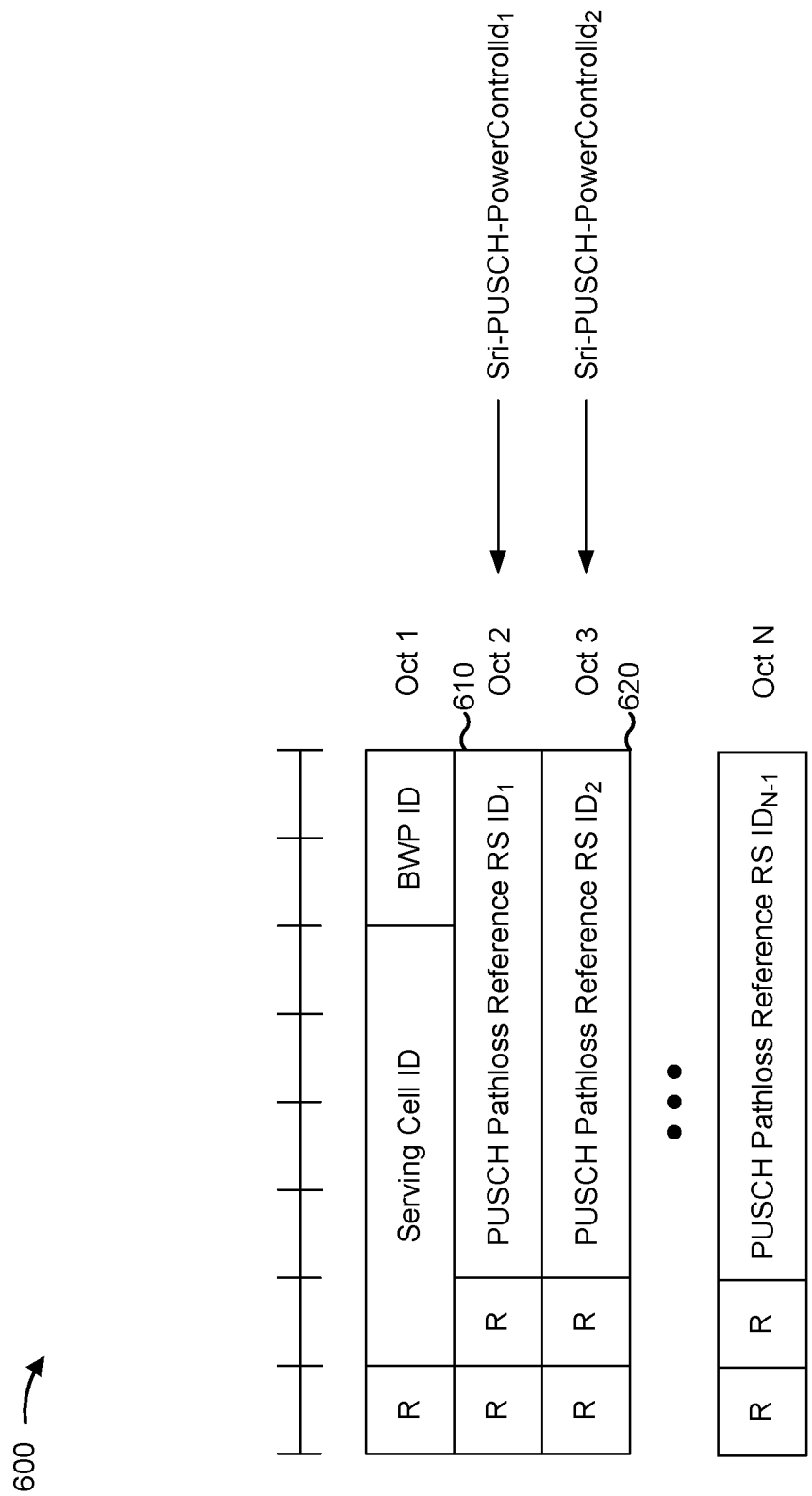

FIG. 6 shows an example of indication of the set of mappings based at least in part on an order or a sequence of the set of pathloss reference RS identifiers in the MAC-layer message. For example, in example 600, the MAC-layer message may indicate respective pathloss reference RS identifiers, and the UE may determine the mappings based at least in part on an order associated with the corresponding PUSCH power control identifier. For example, a first pathloss reference RS identifier (e.g., PUSCH Pathloss Reference RS $ID_1$ shown by reference number 610) may map to a first PUSCH power control identifier (e.g., SRI-PUSCH-PowerControlId$_1$), a second pathloss reference RS identifier shown by reference number 620 may map to a second PUSCH power control identifier, and so on. In this case, the UE may be configured (e.g., using RRC signaling and/or the like) with a set of pathloss reference RS identifiers, and the MAC-layer message may indicate or select how the set of pathloss reference RS identifiers is to be mapped to the set of PUSCH power control identifiers. In some aspects, the UE may be configured with a list of PUSCH power control identifiers (e.g., identifying an order or sequence of the PUSCH power control identifiers), or may receive information identifying or indicating the list of PUSCH power control identifiers. Example 600 may use a smaller message size than an explicit or bitmap-based indication, and may involve more configuration overhead.

FIG. 7 shows an example of indication of the set of mappings based at least in part on a set of table entries that identifies the set of mappings between the set of pathloss reference RS identifiers and the set of PUSCH power control identifiers. In example 700, the UE may be configured (e.g., using RRC signaling and/or the like) with a table that has a plurality of rows. A row of the table may identify a mapping between a pathloss reference RS identifier and a PUSCH power control identifier. In some aspects, the table may be exhaustive of mappings between pathloss reference RS identifiers and PUSCH power control identifiers. For example, assuming pathloss reference RS identifiers of {A B C} and PUSCH power control identifiers of {D E F}, the table may include [A D, A E, A F, B D, B E, B F, C D, C E, C F]. This may improve versatility of the mapping procedure. In some aspects, the table may include a subset of possible mappings between pathloss reference RS identifiers and PUSCH power control identifiers. This may reduce the size of the table, thereby conserving computing resources.

The MAC-layer message may identify one or more table entries. For example, the MAC-layer message may include fields (shown as $T_i$, and which may be referred to as state identifiers) indicating respective mappings between pathloss reference RS identifiers and respective PUSCH power control identifiers. The UE may identify the mappings in accordance with the fields. This table-based approach may reduce the size of the MAC-layer message, and may increase RRC layer overhead.

Figure 8:
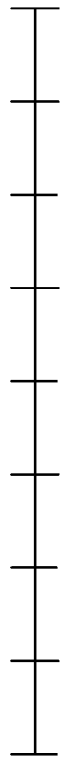

FIG. 8 shows an example of explicit indication of the mapping between a pathloss reference RS identifier (shown as Pathloss Reference RS ID) and an SRS resource set identifier (shown as SRS Resource Set ID). In example 800, the MAC-layer message explicitly identifies a set of pathloss reference RS identifiers (shown as Pathloss Reference RS $ID_1$ through Pathloss Reference RS $ID_M$) and a corresponding set of SRS resource set identifiers (shown as SRS Resource Set $ID_1$ through SRS Resource Set $ID_M$). For example, there may be a one-to-one mapping between Pathloss Reference RS IDs and SRS Resource Set IDs (e.g., Pathloss Reference RS $ID_1$ may be mapped to SRS Resource Set $ID_1$, and so on). The MAC-layer message of example 800 may be particularly useful for explicitly reconfiguring a large number of mappings without the overhead associated with additional or different messages.

Figure 9:
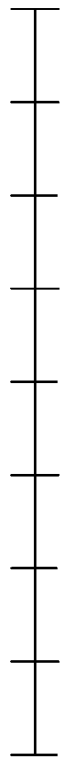

FIG. 9 shows an example of indication of the mapping between a pathloss reference RS identifier and an SRS resource set identifier using a bitmap. For example, the $P_i$ fields shown by reference number 910 may correspond to respective pathloss reference RS identifiers. A UE (e.g., UE 120) may be configured (e.g., using RRC signaling and/or the like) with information indicating a mapping between the $P_i$ fields and the respective pathloss reference RS identifiers. If a $P_i$ field is activated (e.g., if the Pi field is set to a particular value), then the MAC-layer message may include an SRS resource set identifier corresponding to a pathloss reference RS identifier mapped to the $P_i$ field. As an example, assume that $P_1$ and $P_2$ are activated, assume that $P_1$ is mapped to a first pathloss reference RS identifier, and assume that $P_2$ is mapped to a second pathloss reference RS identifier. In this case, the SRS resource set identifier shown by reference number 920 may be mapped to the first pathloss reference RS identifier, and the SRS resource set identifier shown by reference number 930 may be mapped to the second pathloss reference RS identifier. For example, the SRS resource set identifiers may be mapped to the pathloss reference RS identifiers in the order of the activated $P_i$ field values. Example 900 may provide lower overhead than, for example, an explicit signaling scheme.

Figure 10:
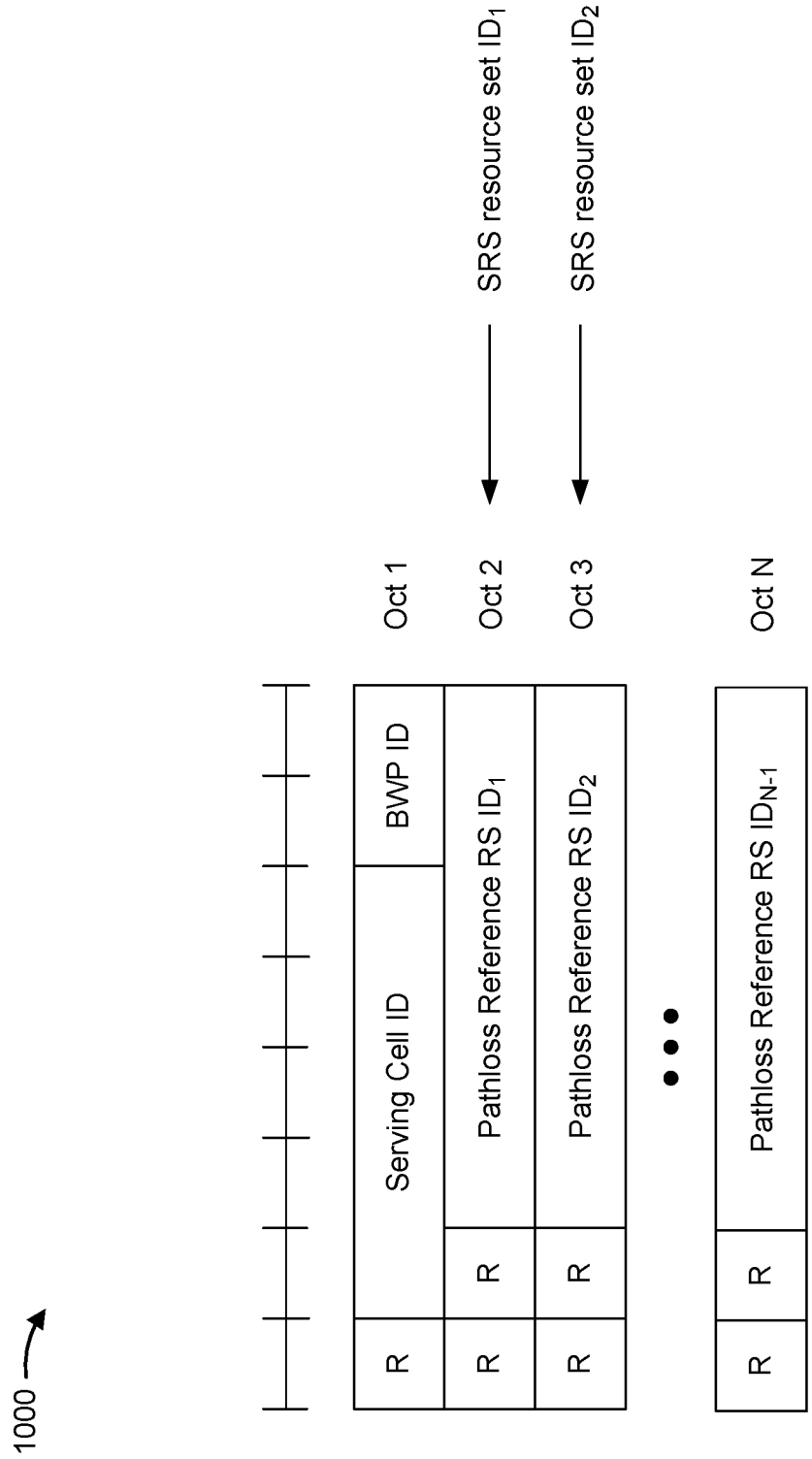

FIG. 10 shows an example of indication of the set of mappings based at least in part on an order or a sequence of the set of pathloss reference RS identifiers in the MAC-layer message. For example, in example 1000, the MAC-layer message may indicate respective pathloss reference RS identifiers, and the UE may determine the mappings based at least in part on an order associated with the corresponding SRS resource set identifier. For example, a first pathloss reference RS identifier (e.g., Pathloss Reference RS $ID_1$) may map to a first SRS resource set identifier (e.g., SRS Resource Set IDA a second pathloss reference RS identifier may map to a second SRS resource set identifier, and so on. In this case, the UE may be configured (e.g., using RRC signaling and/or the like) with a set of pathloss reference RS identifiers, and the MAC-layer message may indicate how the set of pathloss reference RS identifiers is to be mapped to the set of SRS resource set identifiers. In some aspects, the UE may be configured with a list of SRS resource set identifiers (e.g., identifying an order or sequence of the SRS resource set identifiers), or may receive information identifying or indicating the list of SRS resource set identifiers. Example 1000 may use a smaller message size than an explicit or bitmap-based indication, and may involve more configuration overhead.

Figure 11:
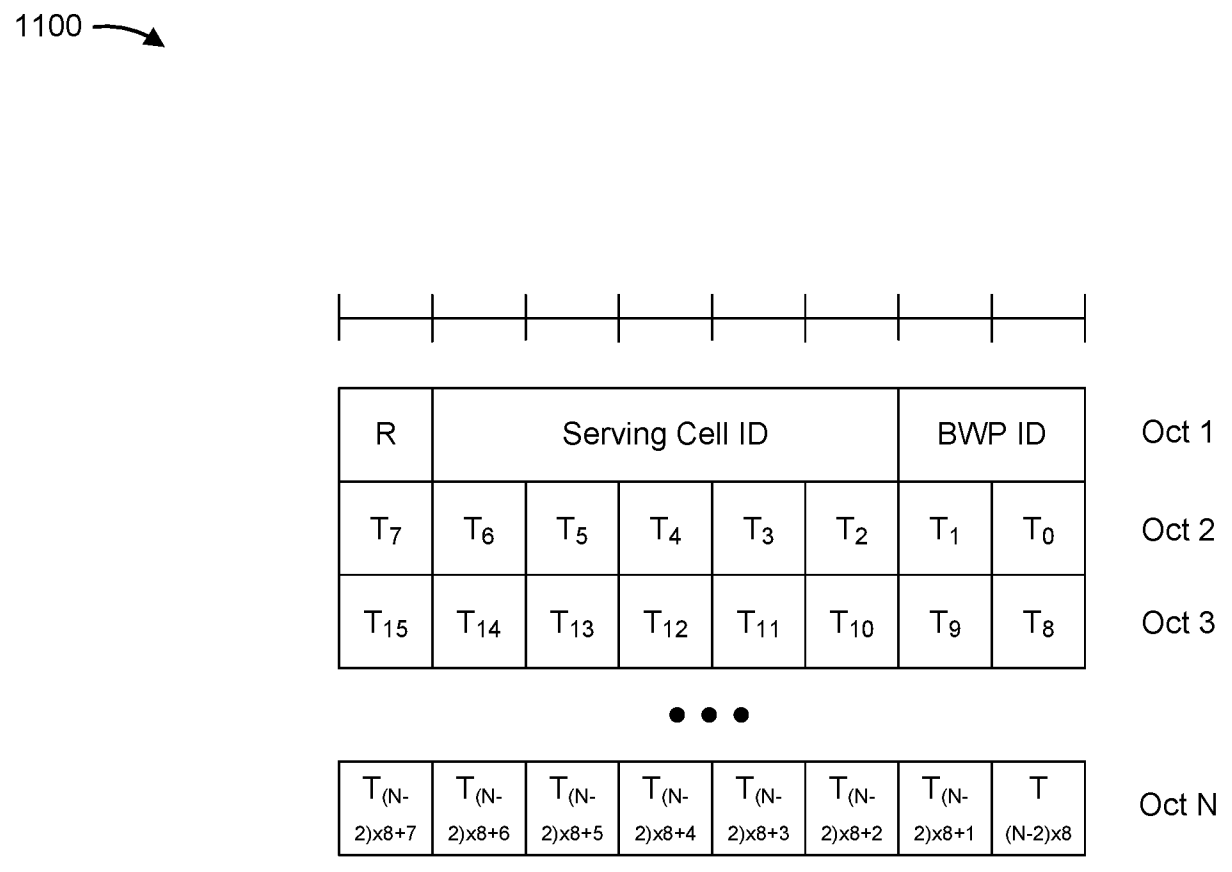

FIG. 11 shows an example of indication of the set of mappings based at least in part on a set of table entries that identifies the set of mappings between the set of pathloss reference RS identifiers and the set of SRS resource set identifiers. In example 1100, the UE may be configured (e.g., using RRC signaling and/or the like) with a table that has a plurality of rows. A row of the table may identify a mapping between a pathloss reference RS identifier and an SRS resource set identifier. In some aspects, the table may be exhaustive of mappings between pathloss reference RS identifiers and SRS resource set identifiers. For example, assuming pathloss reference RS identifiers of {A B C} and SRS resource set identifiers of {D E F}, the table may include [A D, A E, A F, B D, B E, B F, C D, C E, C F]. This may improve versatility of the mapping procedure. In some aspects, the table may include a subset of possible mappings between pathloss reference RS identifiers and SRS resource set identifiers. This may reduce the size of the table, thereby conserving computing resources.

The MAC-layer message may identify one or more table entries. For example, the MAC-layer message may include fields (shown as $T_i$, and which may be referred to as state identifiers) indicating respective mappings between pathloss reference RS identifiers and respective SRS resource set identifiers. The UE may identify the mappings in accordance with the fields. This table-based approach may reduce the size of the MAC-layer message, and may increase RRC layer overhead.

Figure 12:
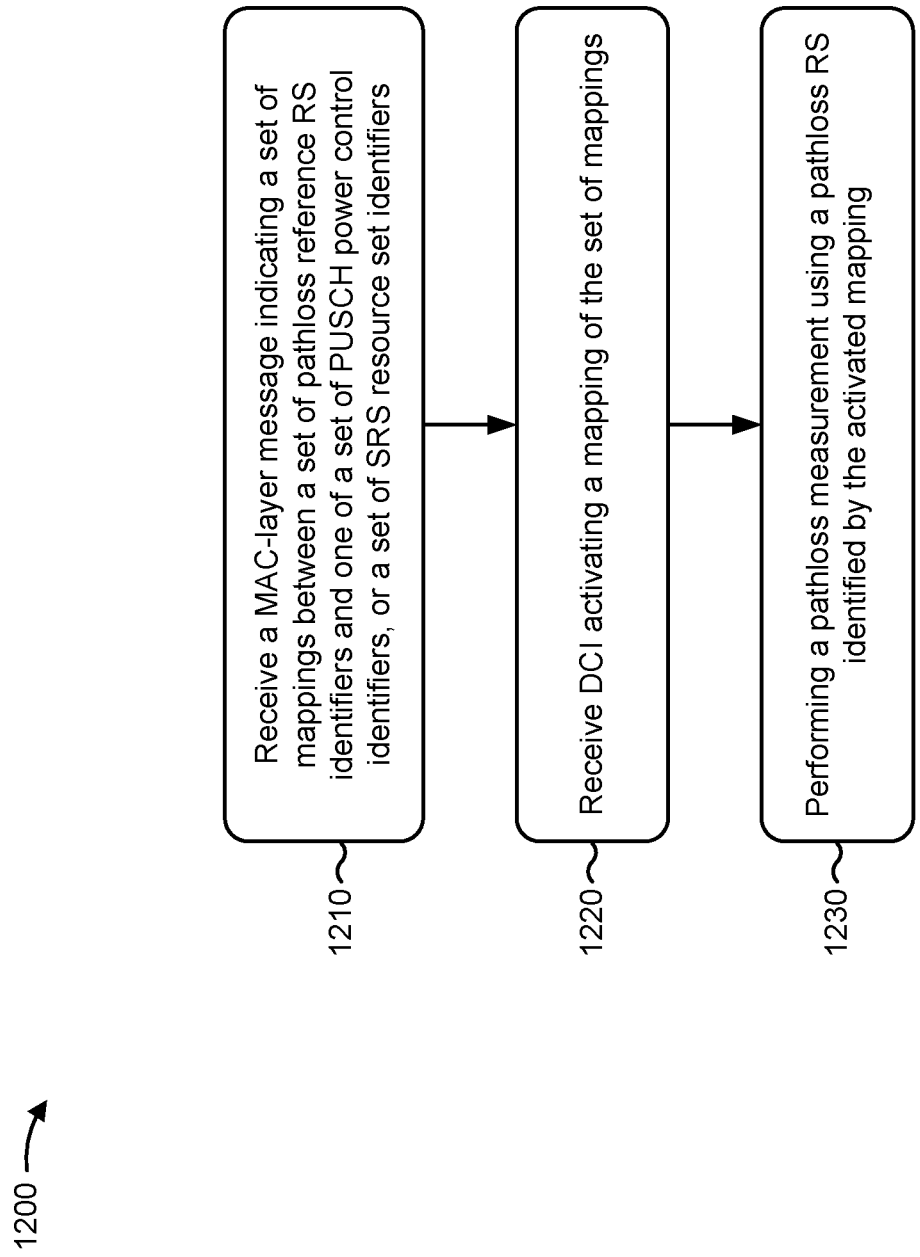
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with MAC layer mapping for a pathloss reference signal.

As shown in FIG. 12, in some aspects, process 1200 may include receiving a MAC-layer message indicating a set of mappings between a set of pathloss reference RS identifiers and one of a set of PUSCH power control identifiers, or a set of SRS resource set identifiers (block 1210). For example, the UE (e.g., using antenna 252, DEMOD 254, MIMO detector 256, receive processor 258, controller/processor 280, and/or the like) may receive a MAC-layer message indicating a set of mappings between a set of pathloss reference RS identifiers and one of a set of PUSCH power control identifiers, or a set of SRS resource set identifiers, as described above.

As further shown in FIG. 12, in some aspects, process 1200 may include receiving DCI activating a mapping of the set of mappings (block 1220). For example, the UE (e.g., using antenna 252, DEMOD 254, MIMO detector 256, receive processor 258, controller/processor 280, and/or the like) may receive DCI activating a mapping of the set of mappings, as described above.

As further shown in FIG. 12, in some aspects, process 1200 may include performing a pathloss measurement using a pathloss RS identified by the activated mapping (block 1230). For example, the UE (e.g., using antenna 252, DEMOD 254, MIMO detector 256, receive processor 258, controller/processor 280, and/or the like) may perform a pathloss measurement using a pathloss RS identified by the activated mapping, as described above.

Process 1200 may include additional aspects, such as any single aspect or any combination of aspects described below and/or in connection with one or more other processes described elsewhere herein.

In a first aspect, the MAC-layer message explicitly identifies the set of pathloss reference RS identifiers and the set of PUSCH power control identifiers.

In a second aspect, alone or in combination with the first aspect, the set of pathloss reference RS identifiers are included in a plurality of pathloss reference RS identifiers, the MAC-layer message indicates that the set of mappings for the set of pathloss reference RS identifiers are to be updated, and the MAC-layer message identifies the set of PUSCH power control identifiers.

In a third aspect, alone or in combination with one or more of the first and second aspects, the MAC-layer message indicates the set of mappings using a bitmap.

In a fourth aspect, alone or in combination with one or more of the first through third aspects, process 1200 includes receiving information configuring a maximum number of pathloss reference RS identifiers that can be configured in the MAC-layer message.

In a fifth aspect, alone or in combination with one or more of the first through fourth aspects, the information configuring the maximum number of pathloss reference RS identifiers that can be configured in the MAC-layer message is received using radio resource control signaling.

In a sixth aspect, alone or in combination with one or more of the first through fifth aspects, the MAC-layer message indicates the set of mappings based at least in part on an order or a sequence of the set of pathloss reference RS identifiers in the MAC-layer message.

In a seventh aspect, alone or in combination with one or more of the first through sixth aspects, the order or the sequence of the set of pathloss reference RS identifiers in the MAC-layer message corresponds to an order or a sequence of the set of PUSCH power control identifiers or the set of SRS resource set identifiers, and wherein information identifying the order or the sequence of the set of PUSCH power control identifiers or the set of SRS resource set identifiers is received using radio resource control signaling.

In an eighth aspect, alone or in combination with one or more of the first through seventh aspects, the MAC-layer message indicates a set of table entries that identifies the set of mappings between the set of pathloss reference RS identifiers and the set of PUSCH power control identifiers.

In a ninth aspect, alone or in combination with one or more of the first through eighth aspects, the set of table entries is selected from a table, and information identifying the table is received using radio resource control signaling.

In a tenth aspect, alone or in combination with one or more of the first through ninth aspects, the set of SRS resource set identifiers are associated with semi-persistent SRS resource sets or aperiodic SRS resource sets.

In an eleventh aspect, alone or in combination with one or more of the first through tenth aspects, the MAC-layer message explicitly identifies the set of pathloss reference RS identifiers and the set of SRS resource set identifiers.

In a twelfth aspect, alone or in combination with one or more of the first through eleventh aspects, the set of pathloss reference RS identifiers are included in a plurality of pathloss reference RS identifiers, the MAC-layer message indicates that the set of mappings for the set of pathloss reference RS identifiers are to be updated, and the MAC-layer message identifies the set of SRS resource set identifiers.

In a thirteenth aspect, alone or in combination with one or more of the first through twelfth aspects, the MAC-layer message indicates the set of mappings using a bitmap.

In a fourteenth aspect, alone or in combination with one or more of the first through thirteenth aspects, the MAC-layer message indicates a set of table entries that identifies the set of mappings between the set of pathloss reference RS identifiers and the set of SRS resource set identifiers.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
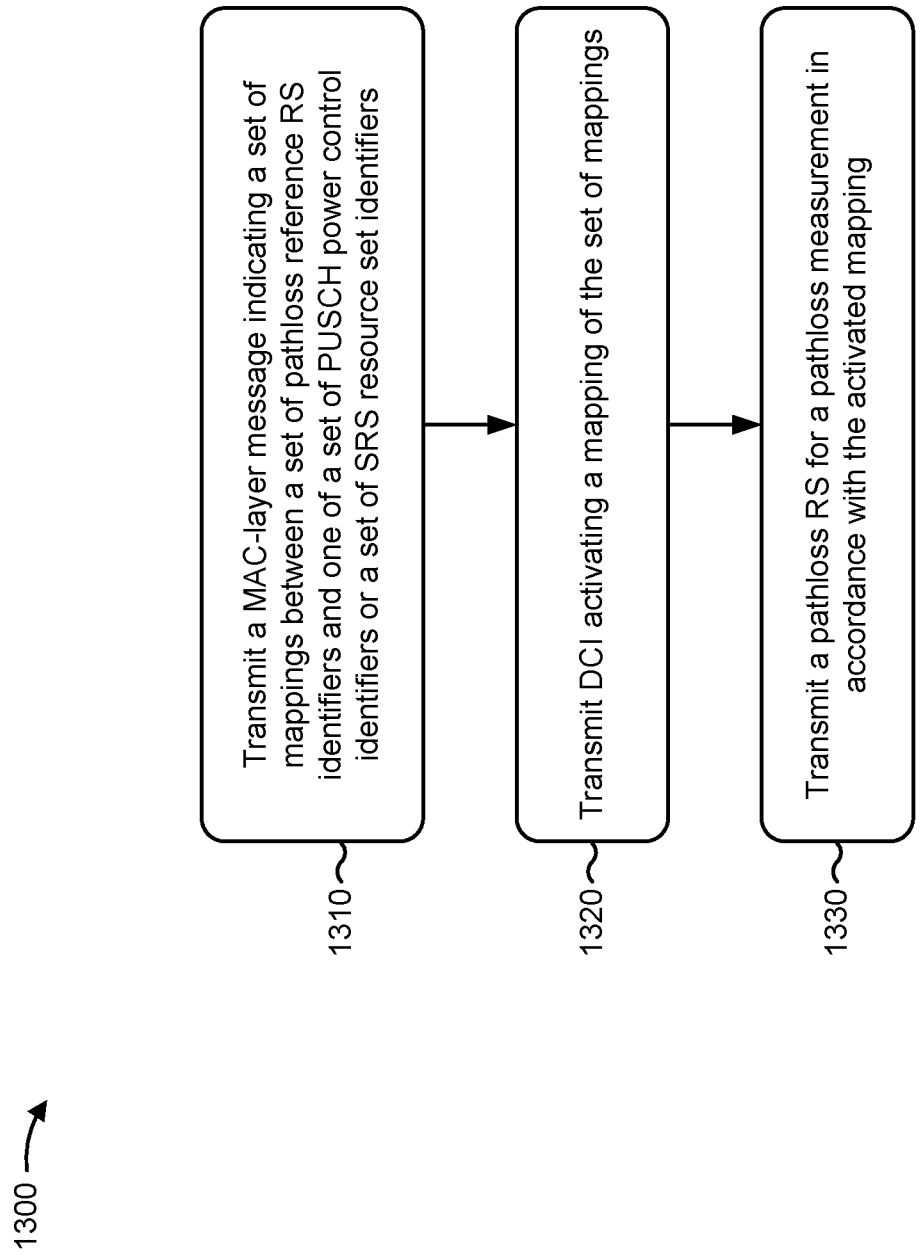
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., BS 110 and/or the like) performs operations associated with MAC layer mapping for a pathloss reference signal.

As shown in FIG. 13, in some aspects, process 1300 may include transmitting a MAC-layer message indicating a set of mappings between a set of pathloss reference RS identifiers and one of a set of PUSCH power control identifiers or a set of SRS resource set identifiers (block 1310). For example, the base station (e.g., using controller/processor 240, transmit processor 220, TX MIMO processor 230, MOD 232, antenna 234, and/or the like) may transmit a MAC-layer message indicating a set of mappings between a set of pathloss reference RS identifiers and one of, as described above.

As further shown in FIG. 13, in some aspects, process 1300 may include transmitting DCI activating a mapping of the set of mappings (block 1320). For example, the base station (e.g., using controller/processor 240, transmit processor 220, TX MIMO processor 230, MOD 232, antenna 234, and/or the like) may transmit DCI activating a mapping of the set of mappings, as described above.

As further shown in FIG. 13, in some aspects, process 1300 may include transmitting a pathloss RS for a pathloss measurement in accordance with the activated mapping (block 1330). For example, the base station (e.g., using controller/processor 240, transmit processor 220, TX MIMO processor 230, MOD 232, antenna 234, and/or the like) may transmit a pathloss RS for a pathloss measurement in accordance with the activated mapping, as described above.

Process 1300 may include additional aspects, such as any single aspect or any combination of aspects described below and/or in connection with one or more other processes described elsewhere herein.

In a first aspect, the MAC-layer message explicitly identifies the set of pathloss reference RS identifiers and the set of PUSCH power control identifiers.

In a second aspect, alone or in combination with the first aspect, the set of pathloss reference RS identifiers are included in a plurality of pathloss reference RS identifiers, the MAC-layer message indicates that the set of mappings for the set of pathloss reference RS identifiers are to be updated, and the MAC-layer message identifies the set of PUSCH power control identifiers.

In a third aspect, alone or in combination with one or more of the first and second aspects, the MAC-layer message indicates the set of mappings using a bitmap.

In a fourth aspect, alone or in combination with one or more of the first through third aspects, process 1300 includes transmitting information configuring a maximum number of pathloss reference RS identifiers that can be configured in the MAC-layer message.

In a fifth aspect, alone or in combination with one or more of the first through fourth aspects, the information configuring the maximum number of pathloss reference RS identifiers that can be configured in the MAC-layer message is transmitted using radio resource control signaling.

In a sixth aspect, alone or in combination with one or more of the first through fifth aspects, the MAC-layer message indicates the set of mappings based at least in part on an order or a sequence of the set of pathloss reference RS identifiers in the MAC-layer message.

In a seventh aspect, alone or in combination with one or more of the first through sixth aspects, the order or the sequence of the set of pathloss reference RS identifiers in the MAC-layer message corresponds to an order or a sequence of the set of PUSCH power control identifiers or the set of SRS resource set identifiers, and wherein information identifying the order or the sequence of the set of PUSCH power control identifiers or the set of SRS resource set identifiers is transmitted using radio resource control signaling.

In an eighth aspect, alone or in combination with one or more of the first through seventh aspects, the MAC-layer message indicates a set of table entries that identifies the set of mappings between the set of pathloss reference RS identifiers and the set of PUSCH power control identifiers.

In a ninth aspect, alone or in combination with one or more of the first through eighth aspects, the set of table entries is selected from a table, and information identifying the table is transmitted using radio resource control signaling.

In a tenth aspect, alone or in combination with one or more of the first through ninth aspects, the set of SRS resource set identifiers are associated with semi-persistent SRS resource sets or aperiodic SRS resource sets.

In an eleventh aspect, alone or in combination with one or more of the first through tenth aspects, the MAC-layer message explicitly identifies the set of pathloss reference RS identifiers and the set of SRS resource set identifiers.

In a twelfth aspect, alone or in combination with one or more of the first through eleventh aspects, the set of pathloss reference RS identifiers are included in a plurality of pathloss reference RS identifiers, the MAC-layer message indicates that the set of mappings for the set of pathloss reference RS identifiers are to be updated, and the MAC-layer message identifies the set of SRS resource set identifiers.

In a thirteenth aspect, alone or in combination with one or more of the first through twelfth aspects, the MAC-layer message indicates the set of mappings using a bitmap.

In a fourteenth aspect, alone or in combination with one or more of the first through thirteenth aspects, the MAC-layer message indicates a set of table entries that identifies the set of mappings between the set of pathloss reference RS identifiers and the set of SRS resource set identifiers.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a medium access control (MAC)-layer message indicating a set of mappings between a set of pathloss reference signal (RS) identifiers and a set of physical uplink shared channel (PUSCH) power control identifiers, wherein the set of PUSCH power control identifiers is included in at least two adjacent octets of the MAC-layer message indicating the set of mappings between the set of pathloss RS identifiers and the set of PUSCH power control identifiers;
   receiving downlink control information (DCI) activating a mapping of the set of mappings, wherein a resource indicator field of the DCI indicates a value associated with the mapping; and
   performing a pathloss measurement using a pathloss RS identified by the activated mapping.

2. The method of claim 1, wherein the MAC-layer message indicating the set of mappings between the set of pathloss RS identifiers and the set of PUSCH power control identifiers explicitly identifies the set of pathloss RS identifiers and the set of PUSCH power control identifiers.

3. The method of claim 1, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated, and wherein the MAC-layer message indicating the set of mappings between the set of pathloss RS identifiers and the set of PUSCH power control identifiers identifies the set of PUSCH power control identifiers.

4. The method of claim 1, further comprising:
   receiving information configuring a maximum number of pathloss RS identifiers that can be configured in the MAC-layer message indicating the set of mappings between the set of pathloss RS identifiers and the set of PUSCH power control identifiers.

5. The method of claim 4, wherein the information configuring the maximum number of pathloss RS identifiers that can be configured in the MAC-layer message indicating the set of mappings between the set of pathloss RS identifiers and the set of PUSCH power control identifiers is received using radio resource control signaling.

6. The method of claim 1, further comprising:
receiving a MAC-layer message indicating a set of mappings between the set of pathloss RS identifiers and a set of sounding reference signal (SRS) resource set identifiers, wherein the set of SRS resource set identifiers is associated with semi-persistent SRS resource sets or aperiodic SRS resource sets.

7. The method of claim 6, wherein the MAC-layer message indicating the set of mappings between the set of pathloss RS identifiers and the set of SRS resource set identifiers explicitly identifies the set of pathloss RS identifiers and the set of SRS resource set identifiers.

8. The method of claim 1, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated.

9. A method of wireless communication performed by a base station, comprising:
transmitting a medium access control (MAC)-layer message indicating a set of mappings between a set of pathloss reference signal (RS) identifiers and a set of physical uplink shared channel (PUSCH) power control identifiers, wherein the set of PUSCH power control identifiers is included in at least two adjacent octets of the MAC-layer message indicating the set of mappings between the set of pathloss RS identifiers and the set of PUSCH power control identifiers;
transmitting downlink control information (DCI) activating a mapping of the set of mappings, wherein a resource indicator field of the DCI indicates a value associated with the mapping; and
transmitting a pathloss RS for a pathloss measurement in accordance with the activated mapping.

10. The method of claim 9, wherein the MAC-layer message indicating the set of mappings between the set of pathloss RS identifiers and the set of PUSCH power control identifiers explicitly identifies the set of pathloss RS identifiers and the set of PUSCH power control identifiers.

11. The method of claim 9, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated, and wherein the MAC-layer message indicating the set of mappings between the set of pathloss RS identifiers and the set of PUSCH power control identifiers identifies the set of PUSCH power control identifiers.

12. The method of claim 9, further comprising:
transmitting information configuring a maximum number of pathloss RS identifiers that can be configured in the MAC-layer message indicating the set of mappings between the set of pathloss RS identifiers and the set of PUSCH power control identifiers.

13. The method of claim 12, wherein the information configuring the maximum number of pathloss RS identifiers that can be configured in the MAC-layer message indicating the set of mappings between the set of pathloss RS identifiers and the set of PUSCH power control identifiers is transmitted using radio resource control signaling.

14. The method of claim 9, wherein the MAC-layer message indicating the set of mappings between the set of pathloss RS identifiers and the set of PUSCH power control identifiers indicates the set of mappings based at least in part on an order or a sequence of the set of pathloss RS identifiers in the MAC-layer message indicating the set of mappings between the set of pathloss RS identifiers and the set of PUSCH power control identifiers.

15. The method of claim 9, further comprising:
transmitting a MAC-layer message indicating a set of mappings between the set of pathloss RS identifiers and a set of sounding reference signal (SRS) resource set identifiers, wherein the set of SRS resource set identifiers is associated with semi-persistent SRS resource sets or aperiodic SRS resource sets.

16. The method of claim 15, wherein the MAC-layer message indicating the set of mappings between the set of pathloss RS identifiers and the set of SRS resource set identifiers explicitly identifies the set of pathloss RS identifiers and the set of SRS resource set identifiers.

17. The method of claim 9, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated.

18. A user equipment (UE) for wireless communication, comprising:
a memory; and
one or more processors coupled to the memory, the one or more processors configured to:
receive a medium access control (MAC)-layer message indicating a set of mappings between a set of pathloss reference signal (RS) identifiers and a set of physical uplink shared channel (PUSCH) power control identifiers, wherein the set of PUSCH power control identifiers is included in at least two adjacent octets of the MAC-layer message indicating the set of mappings between the set of pathloss RS identifiers and the set of PUSCH power control identifiers;
receive downlink control information (DCI) activating a mapping of the set of mappings, wherein a resource indicator field of the DCI indicates a value associated with the mapping; and
perform a pathloss measurement using a pathloss RS identified by the activated mapping.

19. The UE of claim 18, wherein the MAC-layer message indicating the set of mappings between the set of pathloss RS identifiers and the set of PUSCH power control identifiers explicitly identifies the set of pathloss RS identifiers and the set of PUSCH power control identifiers.

20. The UE of claim 18, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated, and wherein the MAC-layer message indicating the set of mappings between the set of pathloss RS identifiers and the set of PUSCH power control identifiers identifies the set of PUSCH power control identifiers.

21. The UE of claim 18, wherein the one or more processors are further configured to:
receive information configuring a maximum number of pathloss RS identifiers that can be configured in the MAC-layer message indicating the set of mappings between the set of pathloss RS identifiers and the set of PUSCH power control identifiers.

22. The UE of claim 21, wherein the information configuring the maximum number of pathloss RS identifiers that can be configured in the MAC-layer message indicating the set of mappings between the set of pathloss RS identifiers and the set of PUSCH power control identifiers is received using radio resource control signaling.

23. The UE of claim 18, wherein the one or more processors are further configured to:
receive a MAC-layer message indicating a set of mappings between the set of pathloss RS identifiers and a set of sounding reference signal (SRS) resource set identifiers, wherein the set of SRS resource set identifiers is associated with semi-persistent SRS resource sets or aperiodic SRS resource sets.

24. The UE of claim 23, wherein the MAC-layer message indicating the set of mappings between the set of pathloss RS identifiers and the set of SRS resource set identifiers explicitly identifies the set of pathloss RS identifiers and the set of SRS resource set identifiers.

25. The UE of claim 18, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated.

26. A base station for wireless communication, comprising:
a memory; and
one or more processors coupled to the memory, the one or more processors configured to:
transmit a medium access control (MAC)-layer message indicating a set of mappings between a set of pathloss reference signal (RS) identifiers and a set of physical uplink shared channel (PUSCH) power control identifiers, wherein the set of PUSCH power control identifiers is included in at least two adjacent octets of the MAC-layer message indicating the set of mappings between the set of pathloss RS identifiers and the set of PUSCH power control identifiers;
transmit downlink control information (DCI) activating a mapping of the set of mappings, wherein a resource indicator field of the DCI indicates a value associated with the mapping; and
transmit a pathloss RS for a pathloss measurement in accordance with the activated mapping.

27. The base station of claim 26, wherein the MAC-layer message indicating the set of mappings between the set of pathloss RS identifiers and the set of PUSCH power control identifiers explicitly identifies the set of pathloss RS identifiers and the set of PUSCH power control identifiers.

28. The base station of claim 26, wherein the set of pathloss RS identifiers is included in a plurality of pathloss RS identifiers, wherein the MAC-layer message indicating the set of mappings between the set of pathloss RS identifiers and the set of PUSCH power control identifiers indicates that the set of mappings for the set of pathloss RS identifiers is to be updated, and wherein the MAC-layer message indicating the set of mappings between the set of pathloss RS identifiers and the set of PUSCH power control identifiers identifies the set of PUSCH power control identifiers.

29. The base station of claim 26, wherein the one or more processors are further configured to:
transmit information configuring a maximum number of pathloss RS identifiers that can be configured in the MAC-layer message indicating the set of mappings between the set of pathloss RS identifiers and the set of PUSCH power control identifiers.

30. The base station of claim 29, wherein the information configuring the maximum number of pathloss RS identifiers that can be configured in the MAC-layer message indicating the set of mappings between the set of pathloss RS identifiers and the set of PUSCH power control identifiers is transmitted using radio resource control signaling.

* * * * *